(12) United States Patent
Frejd

(10) Patent No.: US 6,821,061 B2
(45) Date of Patent: Nov. 23, 2004

(54) THREE-EDGED DRILL FOR CHIP FORMING MACHINING

(75) Inventor: Stefan Frejd, Söderköping (SE)

(73) Assignee: Seco Tools AB, Fagersta (SE)

( * ) Notice: Subject to any disclaimer, the term of this patent is extended or adjusted under 35 U.S.C. 154(b) by 211 days.

(21) Appl. No.: 10/277,894

(22) Filed: Oct. 23, 2002

(65) Prior Publication Data

US 2003/0103820 A1 Jun. 5, 2003

(30) Foreign Application Priority Data

Oct. 24, 2001 (SE) ............................................. 0103552

(51) Int. Cl.⁷ ............................................. B23B 51/06
(52) U.S. Cl. .................... 408/59; 408/211; 408/227; 408/230
(58) Field of Search ................. 408/57, 59, 211, 408/227, 229, 230

(56) References Cited

U.S. PATENT DOCUMENTS

| | | | | |
|---|---|---|---|---|
| 2,847,885 A | * | 8/1958 | Wagner ..................... 408/59 |
| 4,440,532 A | * | 4/1984 | D'Apuzzo ................. 408/229 |
| 4,594,034 A | | 6/1986 | Maier | |
| 4,645,389 A | * | 2/1987 | Maier ........................ 408/230 |
| 4,826,364 A | * | 5/1989 | Grunsky ..................... 408/230 |
| 5,236,291 A | * | 8/1993 | Agapiou et al. ............ 408/211 |
| 5,851,094 A | * | 12/1998 | Strand et al. ............... 409/234 |
| 5,967,712 A | * | 10/1999 | Magill et al. ............... 408/227 |
| 6,045,301 A | | 4/2000 | Kammermeier et al. | |
| 6,283,682 B1 | * | 9/2001 | Plummer .................... 408/57 |
| 6,698,981 B1 | * | 3/2004 | Beno et al. .................. 408/59 |

FOREIGN PATENT DOCUMENTS

| | | | |
|---|---|---|---|
| DE | 26 49 323 | 7/1977 | |
| DE | 77 10 873 | 7/1977 | |
| DE | 3205051 A1 * | 2/1982 | ........... B23B/51/02 |
| DE | 36 24 617 | 1/1988 | |
| DE | 3709647 A1 * | 10/1988 | ........... B23B/51/06 |
| EP | 0238477 A2 * | 3/1987 | ........... B23B/51/06 |
| GB | 2 114 479 | 8/1983 | |
| WO | WO 01/07189 | 2/2001 | |

* cited by examiner

Primary Examiner—Daniel W. Howell
Assistant Examiner—Michael W. Talbot
(74) Attorney, Agent, or Firm—Burns, Doane, Swecker & Mathis, LLP

(57) ABSTRACT

A drill for chip forming metalworking includes three cutting edge structures spaced circumferentially apart. Each cutting edge structure includes a radially outer cutting edge and a radially inner cutting edge. Each radially inner cutting edge is inclined in a radially inner and axially rearward direction from a radially inner end of its associated radially outer cutting edge. That radially inner end constitutes a breakpoint between each radially outer cutting edge and its respective radially inner cutting edge. The breakpoints lie in a common circle whose center coincides with the center axis of the drill.

13 Claims, 3 Drawing Sheets

THREE-EDGED DRILL FOR CHIP FORMING MACHINING

This application claims priority under 35 U.S.C. §119 and/or 365 to Patent Application Ser. No. 0103552-6 filed in Sweden on Oct. 24, 2001.

FIELD OF THE INVENTION

The present invention relates to a three-edged drill for chip forming metal machining.

PRIOR ART

During drilling, chips are produced at ta front tip end of the drill, the chips being formed and transported from the tip-forming end of the drill to the opposite end of the drill, said transportation taking place in the chip channels. During drilling with a three-edged drill, the part of the drill that first reaches the workpiece forces the tip of the drill to rotate around an axis that does not coincide with the rotational axis of the drill shank. Thus, an entrance for the desired hole is obtained that develops outside the desired entrance. An example of said type of three-edged drill is disclosed in WO 01/07189. Furthermore, it is common that the balancing of known drills is deteriorated when the drill is worn.

OBJECTS AND SUMMARY OF THE INVENTION

An object of the present invention is to provide a three-edged drill, at which balancing of the drill is not effected as the drill is worn.

Another object of the present invention is to provide a three-edged drill having a good balance before the entire drill tip is in engagement.

An additional object of the present invention is to provide a three-edged drill of good strength.

These and other objects of the present invention are realized by a drill for chip forming metalworking which comprises a shank that defines a center axis of rotation and has axial front and rear ends. The front end comprises three radially outer cutting edges spaced apart circumferentially with respect to the axis. Three chip channels extend rearwardly from respective ones of the radially outer cutting edges. Three flush channels each terminate in an axially front end of a respective chip channel for conducting flushing fluid. Each radially outer cutting edge includes an axially forwardmost portion disposed at a radially innermost end thereof. The axially forwardmost portions of the radially outer cutting edges are arranged to:

- lie in a common imaginary plane oriented perpendicular to the axis,
- be spaced by equal radial distances from the axis, and
- lie in a common imaginary circle having a center which coincides with the axis and which intersects the three flush channels as the drill is viewed in an axial direction.

BRIEF DESCRIPTION OF THE DRAWINGS

Below, an embodiment example of the invention will be described, reference being made to the appended drawings, wherein.

DESCRIPTION OF PREFERRED EMBODIMENTS OF THE INVENTION

Figure 1A:
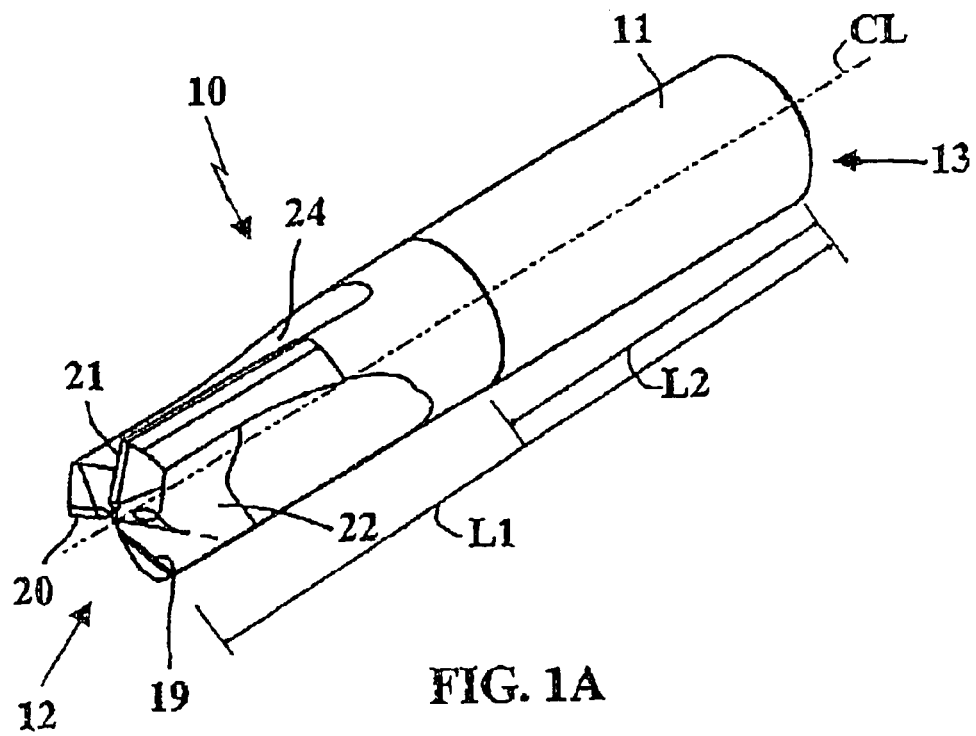
FIG. 1A shows a three-edged drill according to the present invention in a perspective view.
Figure 1B:
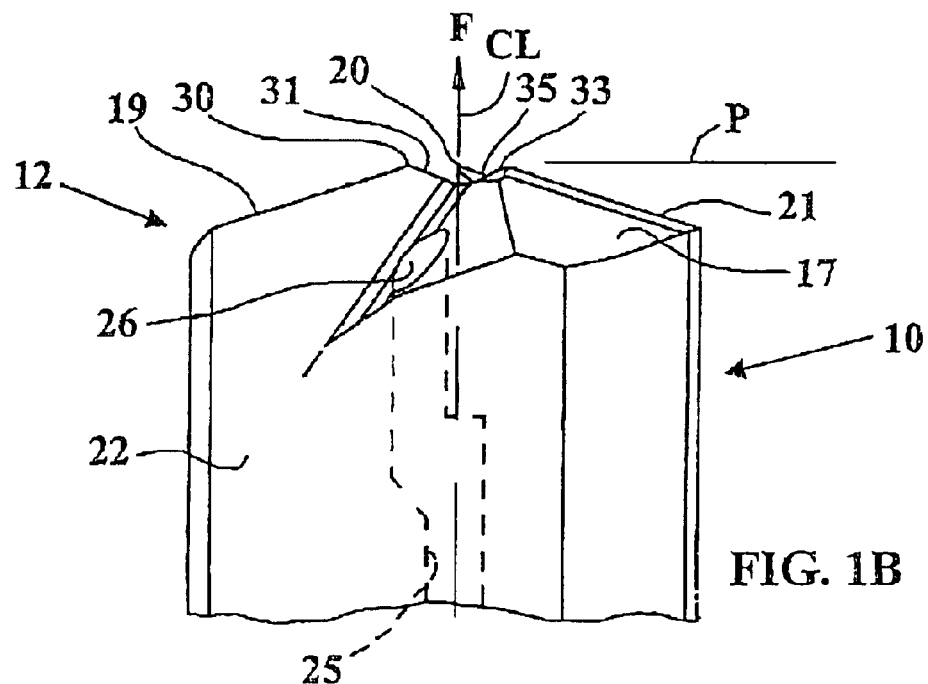
FIG. 1B shows the axially front end in side view of the drill in FIG. 1A.
Figure 1C:
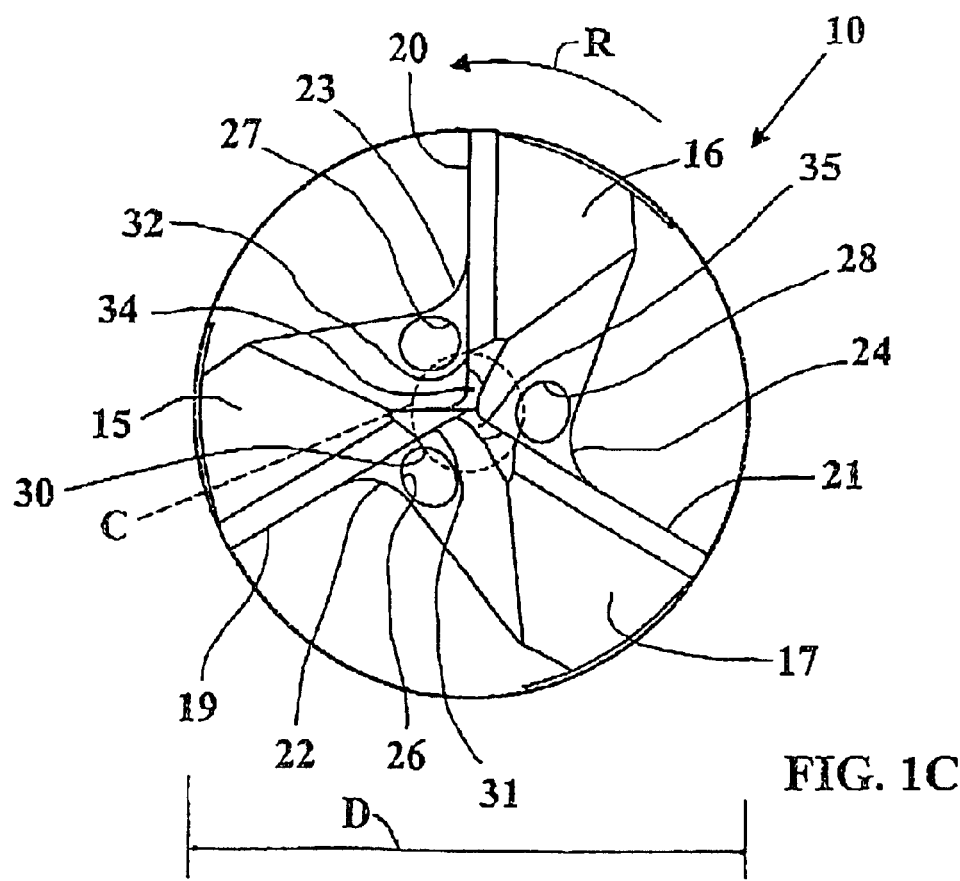
FIG. 1C shows the axially front end in top view of the drill in FIG. 1.

The drill 10 according to FIGS. 1A–1C comprises a substantially solid shank 11 having a longitudinal center axis or tool axis CL. The shank 11 forms a first tip-forming front end 12 and a second, opposite rear end 13. The first tip-forming end 12 comprises three radially outer cutting edges 19, 20 and 21 and three straight chip channels 22, 23 and 24, i.e. one chip channel for each cutting edge. The cutting edges 19, 20 and 21 are arranged having a substantially uniform spacing, i.e. with 120° between successive edges. The drill is made from substantially solid high speed steel or preferably substantially solid cemented carbide. The expression "substantially solid" includes drills that have shanks with holes for cutting or flushing medium in bodies which are otherwise solid. The cemented carbide consists, e.g., of tungsten carbide, and a binder phase such as cobalt, Co and is ground, extruded or extrusion pressed. The straight chip channels 22, 23 and 24 of the drill are parallel to the center axis CL and may extend along the entire drill or more often along a part thereof. The shank 11 is to be fastened in a rotatable spindle, not shown. The drill has three upper flank surfaces 15,16 and 17. All external surfaces and appurtenant edges are preferably made of the same material. The core of the drill may be made of a more tenacious cemented carbide while more peripheral parts may be made of wear resistant cemented carbide.

Even if the described embodiment in the present patent application relates to a drill having a substantially solid shank, the present inventive idea also comprises drills having tube shaped shanks.

Thus, the drill 10 is provided with three cutting edges at the first tip-forming end 12. At the second end 13 of the drill 10, the shank 11 is shaped as a thicker portion, which is intended to be inserted and fastened in a holder, not shown. The direction of rotation of the drill is indicated by the arrow R in FIG. 1C. The front end of the drill 10 has a substantially constant maximum diameter D along the entire length thereof, the length of the drill designated L1 in FIG. 1A. The chip channels 22, 23 and 24 have a substantially constant cross-section shape along the entire length L1 of the drill 10.

A flush duct 25, situated between the chip channels, runs centrally through the drill, said flush duct 25 extending from the second end 13 of the drill and through the drill 10 towards the tip-forming first end 12 to a location immediately inside the flank surfaces 15, 16 and 17. There, three eccentric channels 26, 27 and 28 connect to the flush duct 25 for feeding flushing medium to the respective cutting edges. Each of channels 26, 27 and 28 terminates in a preferably planar surface situated in the feeding direction F axially behind the associated flank surfaces 15–17. All three channels 26, 27 and 28 terminate at the same distance from the center axis CL. The flush duct 25 runs parallel to the center axis of the shaft 10 for at least 80% of the length L1 of the drill, i.e. the respective length of the eccentric channels is maximally 20% of the length L1 of the drill.

Figure 2A:
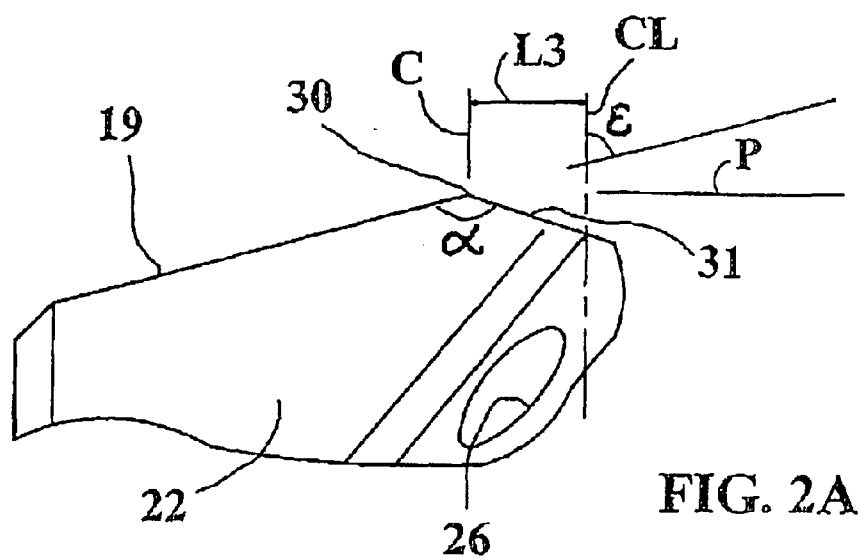
FIG. 2A shows a part of a first center cutting edge.
Figure 2B:
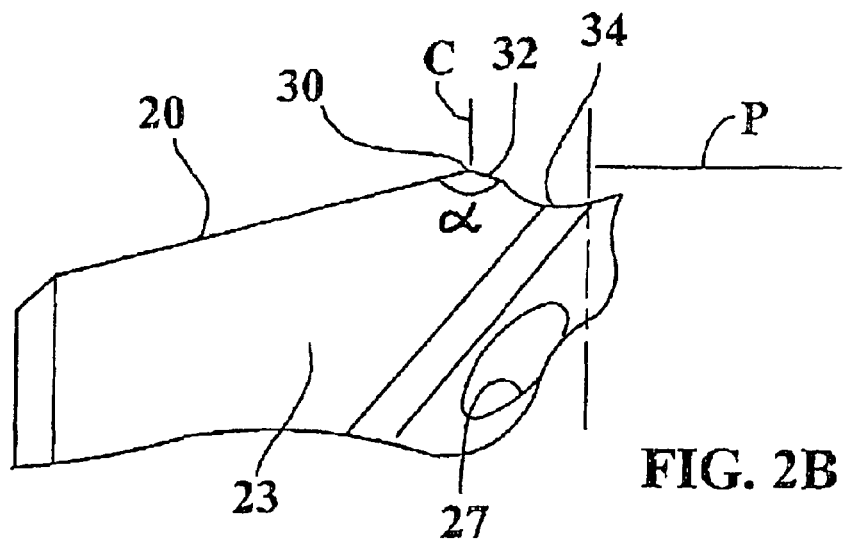
FIG. 2B shows a part of a second edge.
Figure 2C:
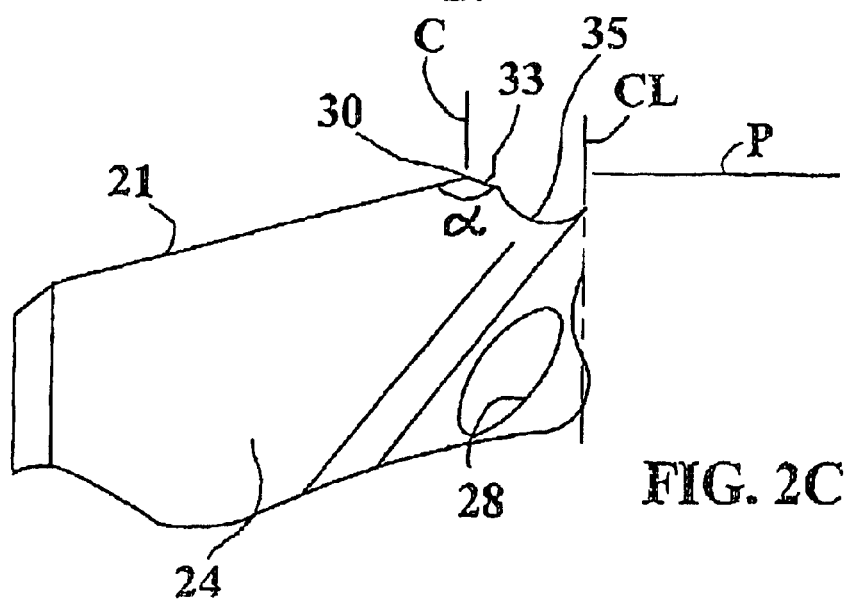
FIG. 2C shows a part of a third edge.

With reference being made to FIGS. 2A–2C, enlarged views of the three cutting edges of the drill according to present invention are shown. The three cutting edges 19, 20 and 21 are straight and have an extension from the periphery of the drill radially inwards towards the center axis CL of the drill. Each one of the cutting edges forms the same tip angle $\epsilon$ with the center axis CL. The tip angle $\epsilon$ is 45° to 89°, preferably 70° to 85°. Each of the straight radially outer cutting edges terminates radially inwards at a breakpoint 30 and forms an inner angle $\alpha$ with a respective rearwardly and inwardly directed straight radially inner edge 31, 32 and 33. The angle $\alpha$ is from 90° to 179° preferably 120° to 160°. All of the breakpoints 30 are located in a plane P, which is perpendicular to the center axis CL, and all breakpoints 30 are spaced the same radial distance L3 from the center axis. By disposing the breakpoints at the same distance from the center axis, the cutting forces are balanced around the rotational axis. Thus, the cutting edges 19, 20, 21 comprise respective axially front parts 30 that are situated at radially inner ends of the edges 19, 20, 21 and arranged in a common plane P. The distance L3 is less than a quarter of, and greater than a tenth of, the maximum diameter D of the front end of the drill. The three breakpoints 30 lie on an imaginary circle C, which intersects three flush ducts 26, 27, 28, as viewed from the front axial end of the drill (FIG. 1C). Each flush duct terminates in an axially front end of a chip channel 22, 23, 24, see FIG. 1C. The closer to the rotational axis that the breakpoints are arranged, the less force is consumed in order to commence the formation of the hole. However, if the breakpoints were instead arranged on the rotational axis, the drilling force would be very large by virtue of the low cutting speed in the center at the same time as the metal in the work piece then sticks (built-up edge formation) so that the quality of the hole is deteriorated.

In order to decrease the cutting forces in the center, two of the straight edges 32, 33 have been shortened radially inwards by means of respective concave recesses 34 and 35. The edges 32, 33 are preferably equally long. Each cutting edge is followed by one of the flank surfaces 15, 16 or 17 in the direction of the rotation R. The drill has no power-consuming cross cutting edge, but only a first straight cutting edge 31 with an extension radially inwards to and somewhat past the center axis CL.

Furthermore, the recesses 34, 35 comprise no chip forming parts but may serve as clearance for a grinding wheel at the provision of the first straight center cutting edge 31. The recess 35 is deeper in relation to the plane P than the recess 34 in order to substantially avoid contact with the workpiece. The breakpoints 30, which constitute axially foremost portions of the radially outer cutting edges 19, 20, 21, are the parts of the drill that contact the workpiece that is to be drilled. Said contact takes place simultaneously at all breakpoints so that a circle initially is cut in the workpiece, which gives a good balance for the drill during the continued initial drilling thereof. If said circle were projected rearwardly along the drill, the circle C would intersect the flush ducts 26, 27 and 28 (see FIG. 1C). Even if the breakpoints are somewhat worn down, said circle will be formed, even if the circle then becomes somewhat wider and forms a ring under comparable conditions in other respects so that balancing of the drill is not affected during wear of the drill. The arrangement of the breakpoints 30 also means that it becomes easier to manufacture the drill so that the outermost tips 30 end up in the same plane P.

Figure 3:
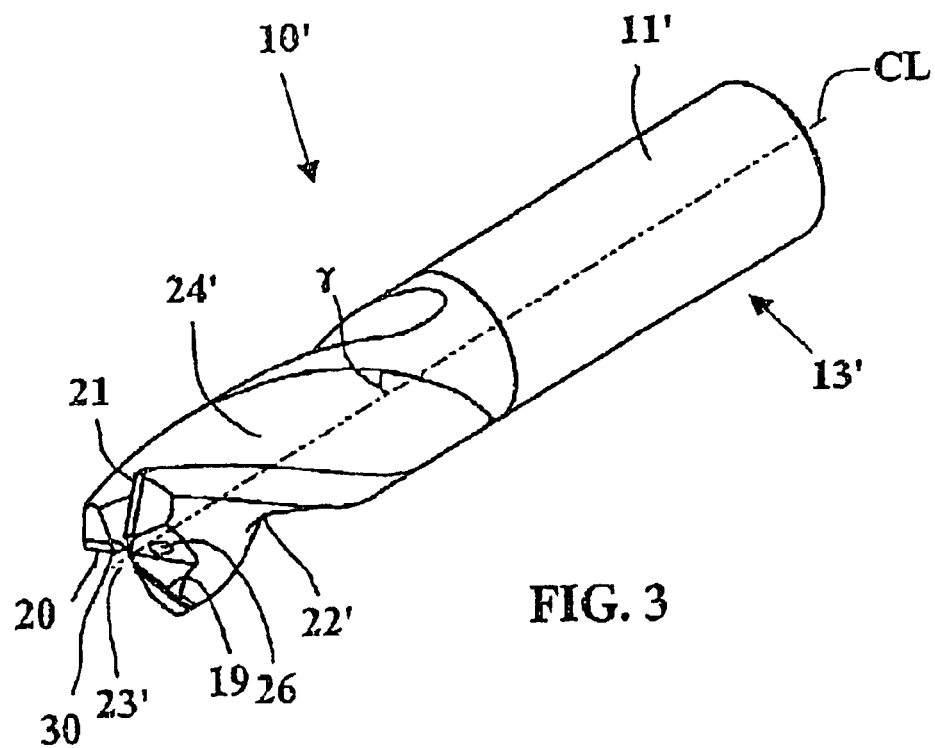
FIG. 3 shows an alternative embodiment of a three-edged drill according to the present invention in a perspective view.

The alternative embodiment example of a drill 10' according to the invention, illustrated in FIG. 3, is a so-called twist drill having three helix chip channels 22', 23' and 24'. The tip-forming end of the drill 10' is identical to the end 12 that has been described above. Therefore, the same reference numbers are used for the same features. The helix chip channels 22', 23' and 24' of the drill may extend along the entire drill or more often along a part thereof. In the illustrated embodiment, the three chip channels 22', 23' and 24' extend helically from the tip-forming end to the shank 11'. As is shown in FIG. 3, the chip channel 23' has a certain helix angle $\gamma$, a preferred value of said angle $\gamma$ being from 5° to 40°. The other chip channels 22' and 24' have an equally large helix angle $\gamma$. In this connection, it should be pointed out that within the scope of the invention, it is possible that the helix angle of the chip channels is negative for the same direction of rotation. A negative helix angle is advantageous for vibration damping of the drill.

Thus, the present invention relates to a drill for chip forming metalworking, the drill having three cutting edges, the axially foremost tips of which have been arranged in a plane in order to jointly form a circle during drilling, only one of the three cutting edges having an extension into the center axis of the drill.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A drill for chip forming metalworking, comprising a shank defining a center axis of rotation, the shank having axially front and rear ends, the front end comprising three radially outer cutting edges spaced apart circumferentially with respect to the axis, three chip channels extending rearwardly from respective ones of the radially outer cutting edges, and three flush channels each terminating in an axially front end of a respective chip channel for conducting flushing fluid, each radially outer cutting edge including an axially forwardmost portion disposed at a radially innermost end thereof, the axially forwardmost portions of the radially outer cutting edges being arranged to:
   lie in a common imaginary plane oriented perpendicular to the axis,
   be spaced by equal radial distances from the axis, and
   lie in a common imaginary circle having a center coinciding with the axis and intersecting the three flush channels as the drill is viewed in an axial direction.

2. The drill according to claim 1, further including three radially inner cutting edges each inclined in a radial inward and axial rearward direction from a respective axially forward portion, wherein each of the axially forward portions constitutes a breakpoint between a radially outer cutting edge and a respective radially inner cutting edge.

3. The drill according to claim 2 wherein only one of the radially inner cutting edges extends all the way to the axis.

4. The drill according to claim 3 wherein the one radially inner cutting edge extends past the axis.

5. The drill according to claim 4 wherein each of the two other radially inner cutting edges terminates radially inwardly in a respective concave recess.

6. The drill according to claim 1 wherein each of the radial distances is less than one quarter of a maximum diameter of the front end of the drill.

7. The drill according to claim 2 wherein an angle formed between each radially outer cutting edge and its respective radially inner cutting edge is in the range of 90° to 179°.

8. The drill according to claim 7 wherein the range is 120° to 160°.

9. The drill according to claim 2 wherein the shank is substantially solid and formed of cemented carbide.

10. The drill according to claim 1 wherein the shank includes a central flush duct which divides into the three flush channels.

11. The drill according to claim 1 wherein the chip channels are straight.

12. The drill according to claim 1 wherein the chip channels are helical.

13. A drill for chip forming metalworking, comprising a shank defining a center axis of rotation, the shank having axially front and rear ends, the front end comprising three radially outer cutting edges spaced apart circumferentially with respect to the axis, three chip channels extending rearwardly from respective ones of the radially outer cutting edges, and three flush channels each terminating in an axially front end of a respective chip channel for conducting flushing fluid, each radially outer cutting edge including an axially forwardmost portion disposed at a radially innermost end thereof, the axially forwardmost portions of the radially outer cutting edges being arranged to:

lie in a common imaginary plane oriented perpendicular to the axis, be spaced by equal radial distances from the axis, and lie in a common imaginary circle having a center coinciding with the axis and intersecting the three flush channels as the drill is viewed in an axial direction;

the drill further including three radially inner cutting edges each inclined in a radial inward and axial rearward direction from a respective axially forward portion, wherein each of the axially forward portions constitutes a breakpoint between a radially outer cutting edge and a respective radially inner cutting edge, wherein only one of the radially inner cutting edges extends all the way to the axis; and wherein each of the radial distances is less than one quarter of a maximum diameter of the front end of the drill, and wherein an angle formed between each radially outer cutting edge and its respective radially inner cutting edge is in the range of 90° to 179°.

\* \* \* \* \*